No. 611,171. Patented Sept. 20, 1898.
H. B. IVES.
SASH FASTENER.
(Application filed July 23, 1896.)

(No Model.) 2 Sheets—Sheet 1.

Witnesses.
Frank P. Prindle.
Henry C. Hazard.

Inventor.
Hobart B. Ives, by
Prindle and Russell, his Attys.

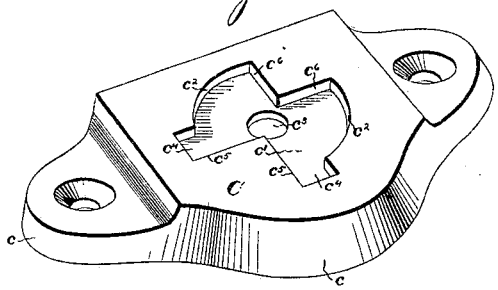
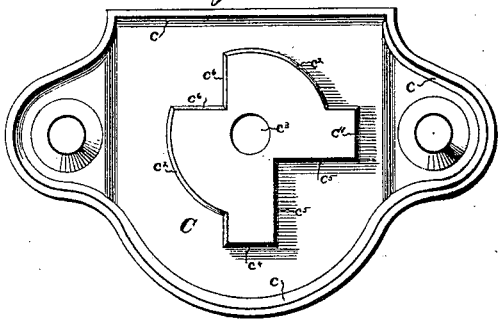
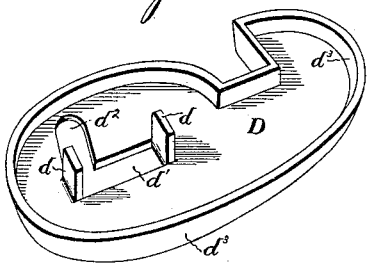
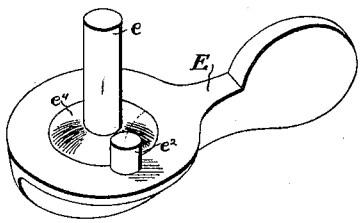
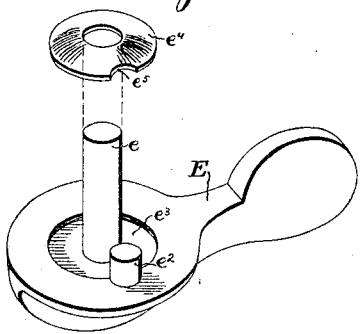
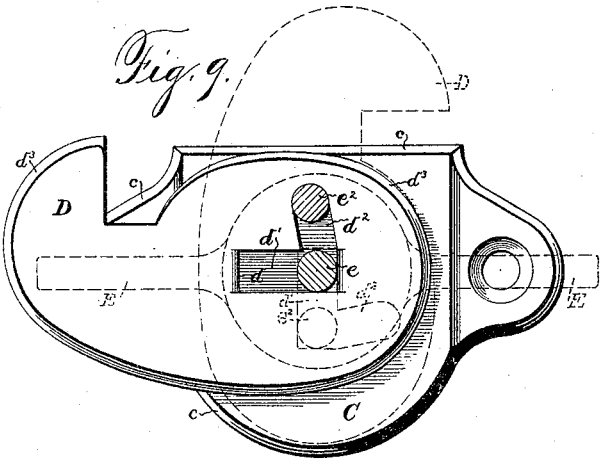

UNITED STATES PATENT OFFICE.

HOBART B. IVES, OF NEW HAVEN, CONNECTICUT.

SASH-FASTENER.

SPECIFICATION forming part of Letters Patent No. 611,171, dated September 20, 1898.

Application filed July 23, 1896. Serial No. 600,258. (No model.)

*To all whom it may concern:*

Be it known that I, HOBART B. IVES, of New Haven, in the county of New Haven, and in the State of Connecticut, have invented certain new and useful Improvements in Sash-Fasteners; and I do hereby declare that the following is a full, clear, and exact description thereof, reference being had to the accompanying drawings, in which—

Figure 1:
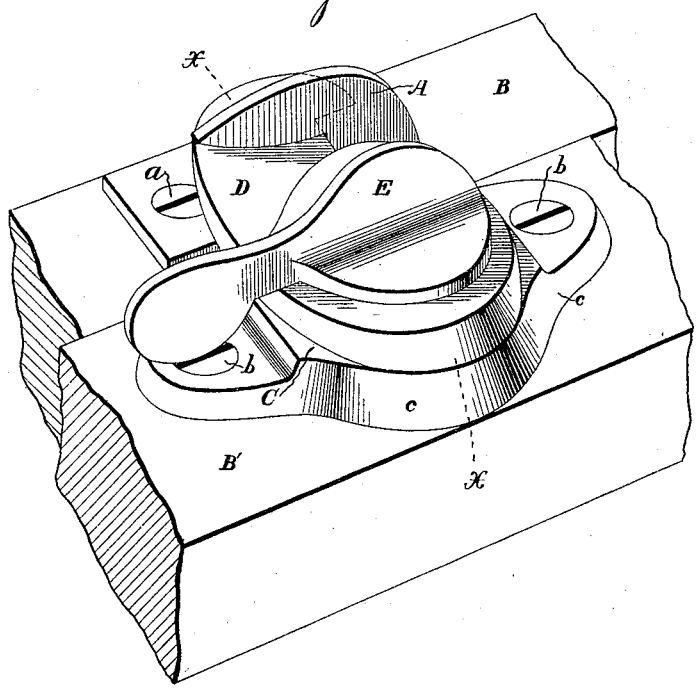
Figures 2, 3:
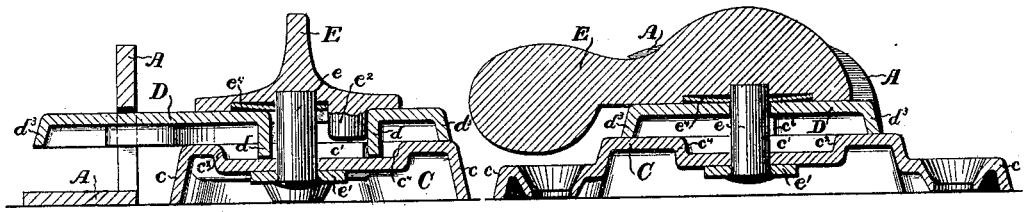

Figure 1 shows a perspective view of my improved sash-fastener with the parts in position as when the latch-hook has been swung into engagement with the keeper into its fixed sash-locking position; Fig. 2, a view of a section on line $x\,x$ of Fig. 1; Fig. 3, a view of a section on a line at right angles to line $x\,x$; Fig. 4, a perspective view of the base of the fastener; Fig. 5, a bottom plan view of the same; Fig. 6, a perspective view of the under side of the latch-hook; Fig. 7, a similar view of the under side of the turning-knob with the concave washer in place therein; Fig. 8, a similar view, but with the washer shown separated from the knob; and Fig. 9, a plan view of the fastener with the knob shown only in dotted lines and the pivot-pin in section, the parts being shown in full lines in position which they have when the latch-hook is swung back and locked in its open position and in dotted lines in the position assumed by them when the fastener is closed to lock the sash-rails together.

Letters of like name and kind refer to like parts in each of the several figures.

The object of my invention has been to provide an improved fastener for locking together the meeting-rails of sashes; and to this end my invention consists in the fastener and in the parts thereof, constructed, arranged, and combined, as hereinafter specified.

The special purpose which I have had in view in inventing the present sash-fastener has been to make a fastener with the base and latch-hook of stamped metal, having its parts made in the cheapest and yet strongest way, and which shall require the least possible number of operations to complete its parts and be most economical of material in its manufacture.

In the drawings, A designates the keeper, which is to be attached in the ordinary way, by screws $a\,a$ or otherwise, to the meeting-rail B of one sash, and C designates the base upon which the latch-hook D, to engage the keeper A, rests and moves. This base is to be attached by screws $b\,b$ or otherwise, as desired, to the meeting-rail B' of the other sash. As shown, it is made of stamped metal, preferably steel, though brass or other alloy or metal can be used, if desired, without departure from my invention. It is stamped so as to have its main portion raised to form a table upon which the latch-hook D can rest and be supported and a downwardly-projecting flange $c$ extending around its edge, such flange being intended to rest upon the meeting-rail B' of the sash to which the base is fastened. The middle portion of the table or raised main portion of the base is stamped down to form a recess $c'$, the side walls of which are to form the guides and locking-surfaces for engaging the lugs $d\,d$ on the latch-hook. The top surface of the portion stamped down to form the recess $c'$ is carried so far down that a flange or distinct connection is produced between the bottom of the recess and the main or raised portion of the base that adds most materially to the stiffness and strength of the device. As shown, the walls of the recess are shaped so as to form two curved guiding-surfaces $c^2\,c^2$, concentric with a hole $c^3$, extending through the bottom of the recess $c'$, and the two recesses or offsets $c^4\,c^4$, extending at right angles to each other. One end of each of the curved surfaces $c^2\,c^2$ extends around to one of such recesses or offsets. The adjoining sides of the recesses or offsets $c^4\,c^4$ extend inward until they meet, forming stop-shoulders $c^5\,c^5$. Diametrically opposite to the point where these sides meet, on the other side of the hole $c^3$, is a second inwardly-extending portion of the raised part of the base, having its opposite sides in line with opposite sides of the recess or offsets $c^4\,c^4$ and forming stop-shoulders $c^6\,c^6$.

The latch-hook D, having the longitudinal slot $d'$ and the two dependent lugs $d\,d$ at opposite ends of the slot, rests upon the base C, so that its lugs enter the recess $c'$ of the base. Extending out from the inner end of slot $d'$ at or nearly at right angles thereto is another slot $d^2$. The latch-hook, like the base, is stamped out of sheet metal, so as to have the flange $d^3$ on its under side extending around its edge and adapted to rest and slide upon the table or raised portion of the base. The lugs $d\ d$ on the latch-hook are of such length that they extend down below the top of the raised part of the base well into the recess $c'$ and are at such distance apart that as one is in contact with one of the curved surfaces $c^2$ the other will stand close to the other curved surface $c^2$. These lugs are formed in one piece with the latch-hook, being made of tongues or ears each separated from the body of the latch-hook except at one end and bent downward to stand at substantially a right angle to such body, as shown. They can be readily struck down by a suitably-shaped die, the spaces left by the bending down of the portions forming the lugs making the end portions of the slot $d'$.

The knob E for actuating the latch-hook and holding it in its closed and opened positions carries the pivot-pin $e$, preferably cast in it, which pin extends down through the slot $d'$ in the latch-hook D and the hole $c^3$ in the base C and has its lower end headed down against the under side of a washer $e'$ on the lower side of the bottom of the depressed part of the table on the base. The knob E also has on its under side an eccentric pin or stud $e^2$ to engage the slot $d^2$. Around the pivot-pin $e$ in the under side of the knob is a circular recess $e^3$, in which is situated the edge of a cupped or concave washer $e^4$, having its concave side turned upward toward the knob. The recess is slightly greater in diameter than the washer when the latter is not compressed, as hereinafter described, the object being to allow room for the spread of the washer edge. In one side of the washer there is a notch $e^5$ to engage the stud $e^2$, so as to make the washer rotate with the knob. The washer is made of such concavity that its under side will, before the knob is forced down upon the latch-hook, project beyond the plane of the under side of the knob. With this construction as the parts are being assembled and the knob is pressed down in place over the latch-hook and held there by the described heading of the lower end of the pivot-pin against the under side of the washer $e'$ the washer $e^4$ will be compressed and flattened, so that it will form a spring to bear with a strong but yielding pressure upon the top of the latch-hook around the pin $e$. This gives the desired friction to oppose the free accidental swinging of the knob with reference to the latch and causes the latch-hook to be held down in place on the base, so that the desired friction between the hook and base is obtained. Both the base and the latch-hook being made with the flanges extending around their bodies are very strong and well adapted to resist any power tending to bend them out of shape, even when the metal from which they are stamped is quite thin.

The operation of my sash-fastener is briefly as follows: With the parts of the device in the position indicated in full lines in Fig. 9 and the fastener, with its keeper, fastened to the meeting-rails of two sashes, as indicated in Fig. 1, if the knob E be turned in the direction of the arrow the engagement of the eccentric stud $e^2$ with the slot $d^2$ in the latch-hook will tend to swing the latch-hook about the pivot-pin $e$ as a center; but this swinging is prevented by the engagement of the front or outer lug $d$ on the latch-hook with the side recess or offset $c^4$ from recess $c'$. The latch-hook is then moved longitudinally inward without swinging until the said lug $d$ is clear of the forward wall of the offset and in line with the curved surface $c^2$, which runs to such offset. The rear or inner lug $d$ then comes into contact with the outer curved surface $c^2$, and the latch-hook, being free to turn, is by the pressure of the stud $e^2$ against the side of the slot $d^2$ caused to swing about the pivot-pin $e$, being guided in its swinging by the rear or inner lug $d$ engaging the inner or rear curved surface $c^2$ on the base. This swinging of the latch-hook as the knob is turned continues until the hook comes into position to engage the keeper A. The rear or inner lug $d$ on the hook is then in line with the offset $c^4$ at the rear side of the recess $c'$ and in contact with the shoulder $c^5$, formed of the inwardly-extending farther side of the offset. As this shoulder $c^5$ stops the swing of the latch-hook and the latter is by the presence of the adjoining recess or offset $c^4$ left free to move longitudinally inward or rearward the pressure of the stud $e^2$ on the side of the slot $d^2$ causes the hook to be drawn inward to carry its lug $d$ into the offset and cause its hooked end to draw the keeper toward the base C, so as to draw the sash bars or rails together. In the meantime one of the other stop-shoulders $c^6$ $c^6$ has acted as a stop for the other or outer lug $d$ on the latch-hook. As the latch-hook is drawn in in the manner described the eccentric stud $e^2$ of the knob E rides in along the rear side of the slot $d^2$ until it comes in contact with the rear end of slot $d'$ in position to surely and effectually hold the latch-hook from outward longitudinal movement. The latch-hook will then be locked from movement in any direction, since it is also incapable of swinging because of the engagement of its rear lug $d$ with the locking recess or offset $c^4$ and the engagement of the pivot-pin $e$ with the slot $d'$. Rotation or swinging of the knob in the other direction first causes the stud $e^2$ to pass into slot $d^2$, so that the pressure of the stud on the outer or forward side of such slot will cause the latch-hook to first move outward to free its rear or inner lug $d$ from the locking offset or recess $c^4$ and bring its other lug $d$ against the forward or outer curved surface $c^2$. The latch-hook being then guided by the engagement of its lug with this surface will swing about the pivot-pin $e$ as a center, so as to disengage its hook from the keeper A. This swinging of the latch-hook, caused by the engagement of the stud $e^2$ with slot $d^2$, continues until stopped by the striking of the outer or forward lug $d$ against the stop-shoulder $c^5$ on the farther side of the offset $c^4$, toward which such lug $d$ is moved by the first-described swinging of the latch-hook. As the swinging movement of the latch-hook is thus arrested by the stop-shoulder the pressure of the stud $e^2$ upon the side of slot $d^2$ moves the latch-hook longitudinally outward again into the position in which it is shown in full lines in Fig. 9, where it is held from swinging back toward the keeper again by the engagement of the outer lug $d$ with the retaining-offset $c^4$, into which it has been moved, and the engagement of the pivot-pin $e$ with the slot $d'$. As the forward or outer lug comes into engagement with the stop-shoulder $c^5$ at the end of the back swing of the latch-hook the other lug $d$ engages one of the other stop-shoulders $c^6$, which assists in guiding the latch-hook in its described outward longitudinal movement taking place at the end of its forward swing.

It will be noticed that the guiding and locking lugs $d\ d$ on the latch-hook, which are, as hereinbefore described, formed by bending down portions or tongues of the metal of the latch-hook, are so shaped and situated as to best and most strongly resist any power tending to swing the latch-hook when the latter is locked shut or open. All strain brought upon one of the lugs by force exerted to swing the latch, when the lug is in the respective retaining recess or offset $c^4$, will be in a direction substantially in line with the side or edge of the lug and at right angles to the plane in which the lug has been bent down from the latch-hook, so that such strain can have no tendency to bend the lug up or down. The base is strengthened and made very stiff against bending both by the flange forming part of it and extending downward around its edge and by the stamping down of the middle portion of its main part or table to form the recess $c'$. The stamped-down part being in one piece with said main part or table renders the latch-hook-supporting part of the base most stiff and strong, even when such base is made of thin metal.

Having thus described my invention, what I claim is—

1. In a sash-fastener, in combination with a base, stamped to give it a raised portion with a dependent stiffening-flange around it, and a recess formed in the raised portion by stamping down a part of such portion, to carry the top of the stamped-down part below the under face of the main part of the raised portion, so as to leave a stiffening-flange connecting the bottom of the recess with the main part of the raised portion of the base, such recess having its sides provided with one or more curved surfaces, with an offset or notch at the end of each curved surface, a latch-hook to swing and slide on such base, having one or more guiding and locking lugs, a rotary knob and eccentric connections between such knob and latch-hook, substantially as and for the purpose set forth.

2. In a sash-fastener, in combination with a base provided with a curved guiding-surface and a locking offset or notch, a stamped latch-hook having a guiding and locking lug formed on it by bending a portion of the latch-hook at an angle to its body, the plane of bending of such portion being such that the side edges of the lug produced are presented to the sides of the locking notch or offset, when such lug is seated in the latter, a rotary knob, and eccentric connections between such knob and latch-hook, for actuating the latter, substantially as and for the purpose described.

3. In a sash-fastener, in combination with suitable curved guiding-surfaces, and locking-offsets at the ends of such surfaces, a stamped latch-hook having the two guiding and locking lugs formed on it, by bending down portions of its body, the plane of bending being such that the lugs will, when in the locking-offsets on the base, present their opposite side edges to the opposite sides of such offsets, a rotary knob, and eccentric connections between such knob and the latch-hook for actuating the latter, substantially as and for the purpose described.

4. In a sash-fastener, in combination with a base provided with a curved guiding-surface and a shoulder, a stamped latch-hook having a dependent stiffening-flange around it, a longitudinal slot, an eccentric slot connected with the longitudinal slot, and a guiding and locking lug formed by bending down a portion of the latch-hook, at the end of the longitudinal slot, the bending down of such portion being in the same plane with the length of the slot, a rotary knob having an eccentric stud, and a pivot-pin connecting such knob with the base, passing through the longitudinal slot in the latch-hook, substantially as and for the purpose described.

5. In a sash-fastener, in combination with a stamped base having the raised portion, with dependent stiffening-flange around it, and the recess, formed by stamping down a part of such portion, having a curved guiding-surface with a locking notch or offset at the end thereof, the stamped latch-hook having the dependent stiffening-flange, to rest upon the raised portion of the base, a longitudinal slot, an eccentric slot, and a portion at the end of the longitudinal slot bent down in the same plane with the latter slot to form a lug extending into the recess in the base, a rotary knob having an eccentric lug, and a pivot-pin connecting such knob with the base, and passing through the longitudinal slot in the latch-hook, substantially as and for the purpose shown.

6. In a sash-fastener, in combination with a suitable base provided with a guiding-surface and a locking-shoulder, a latch-hook having a longitudinal slot, an eccentric slot and a portion to engage the guiding-surface and shoulder on the base, a rotary knob, having a pin or stud to engage the eccentric slot in the base, a pivot-pin connecting the knob with the base, and passing through the longitudinal slot in the latch-hook, and a cupped spring-washer around the pivot-pin, between a portion of the knob and the latch-hook, connected with the knob so as to rotate with the latter, with reference to the latch-hook, substantially as and for the purpose described.

In testimony that I claim the foregoing I have hereunto set my hand this 27th day of June, 1896.

HOBART B. IVES.

Witnesses:
CHAS. G. KEELER,
WM. A. ELDRIDGE.